United States Patent
Chakraborty

(10) Patent No.: US 11,297,828 B2
(45) Date of Patent: Apr. 12, 2022

(54) SURFACE TENSION MEDIATED LYO-PROCESSING TECHNIQUE FOR PRESERVATION OF BIOLOGICS

(71) Applicant: THE REGENTS OF THE UNIVERSITY OF MICHIGAN, Ann Arbor, MI (US)

(72) Inventor: Nilay Chakraborty, Troy, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 599 days.

(21) Appl. No.: 16/085,379

(22) PCT Filed: Mar. 14, 2017

(86) PCT No.: PCT/US2017/022299
§ 371 (c)(1),
(2) Date: Sep. 14, 2018

(87) PCT Pub. No.: WO2017/160835
PCT Pub. Date: Sep. 21, 2017

(65) Prior Publication Data
US 2019/0082677 A1 Mar. 21, 2019

Related U.S. Application Data

(60) Provisional application No. 62/307,761, filed on Mar. 14, 2016.

(51) Int. Cl.
*A01N 1/02* (2006.01)
*F26B 5/06* (2006.01)

(52) U.S. Cl.
CPC ......... *A01N 1/0221* (2013.01); *A01N 1/0231* (2013.01); *A01N 1/0284* (2013.01); *A01N 1/0289* (2013.01); *F26B 5/06* (2013.01)

(58) Field of Classification Search
None
See application file for complete search history.

(56) References Cited

U.S. PATENT DOCUMENTS

| | | | |
|---|---|---|---|
| 4,205,132 | A | 5/1980 | Sandine et al. |
| 6,528,309 | B2 | 3/2003 | Levine |
| 7,883,664 | B2 | 2/2011 | Elliott et al. |
| 8,349,252 | B2 | 1/2013 | Elliott et al. |
| 2005/0186185 | A1 | 8/2005 | Conrad et al. |
| 2011/0165553 | A1 | 7/2011 | Elliott et al. |
| 2012/0039956 | A1 | 2/2012 | Harel et al. |
| 2012/0076854 | A1 | 3/2012 | Hope et al. |
| 2013/0260452 | A1 | 10/2013 | Toner et al. |
| 2015/0037783 | A1 | 2/2015 | Herickhoff et al. |

FOREIGN PATENT DOCUMENTS

| | | |
|---|---|---|
| CA | 2663440 C | 7/2014 |
| WO | WO-1997-04801 A1 | 2/1997 |
| WO | 2005040398 A2 | 5/2005 |
| WO | 2011047380 A2 | 4/2011 |
| WO | 2011089391 A1 | 7/2011 |
| WO | WO-2015-191570 A1 | 12/2015 |

OTHER PUBLICATIONS

Stokich, et al. (2014) "Cryopreservation of hepatocyte (HepG2) cell monolayers: Impact of trehalose", Cryobiology, 69: 281-90.*
"Growth and Maintenance of Flp-In™ cell lines: User Guide," [online] Thermo Fisher Scientific Inc., Jan. 31, 2020, [retrieved on Jan. 13, 2021] Retrieved from the Internet: <URL: https://www.thermofisher.com/order/catalog/product/R75807#/R75807>, 24 pages.
Albanese, D. et al., "Effects of an innovative dipping treatment on the cold storage of minimally processed Annurca apples" Food Chem, 2007, vol. 105(3), pp. 1054-1060; DOI: 10.1016/j.foodchem.2007.05.009.
Buitink, Julia et al., "Influence of Water Content and Temperature on Molecular Mobility and Intracellular Glasses in Seeds and Pollen," Plant Physiol. (1998) 118, pp. 531-541.
Chakraborty, Nilay et al., "A simple mechanistic way to increase the survival of Mammalian cells during processing for dry storage," Biopreserv Biobank (Jun. 2010) 8(2), pp. 107-114; DOI: 10.1089/bio.2010.0010 (Abstract Only).
Chakraborty, Nilay et al., A Spin-Drying Technique for Lyopreservation of Mammalian Cells Annals of Biomedical Engineering, May 2011, vol. 39, No. 5, pp. 1582-1591; DOI: 10.1007/s10439-011-0253-1.
CHO-K1 (ATCC® CCL-61™. Datasheet [online], American Type Culture Collection, 2016 [retrieved on Jan. 13, 2021]. Retrieved from the Internet: <URL: http://www.atcc.org/products/all/CCL-61.aspx>, 2 pages.
Gubiner, Barry M., "Cell Adhesion: The Molecular Basis of Tissue Architecture and Morphogenesis," Cell, (Feb. 9, 1996) vol. 84, pp. 345-357; DOI: 10.1016/S0092-8674(00)81279-9.
He, Xiaoming et al., "Water activity and mobility in solutions of glycerol and small molecular weight sugars: Implication for cryo- and lyopreservation," Journal of Applied Physics 100, 074702 (2006); DOI:10.1063/1.2336304 (Abstract only).
Miller, Danfroth P. et al., "Thermophysical Properties of Trehalose and Its Concentrated Aqueous Solutions," Pharmaceutical Research (1997), 14, pp. 578-590.
Ragoonanan, Vishard et al., "Heterogeneity in Desiccated Solutions: Implications for Biostabilization," Biophys J., (2008) vol. 94, pp. 2212-2227; DOI: 10.1529/biophysj.107.110684.

(Continued)

*Primary Examiner* — Robert M Kelly
(74) *Attorney, Agent, or Firm* — Harness, Dickey & Pierce, P.L.C.

(57) ABSTRACT

Methods and devices for lyo-processing biological materials are provided. The methods include submerging the biological molecules or cells in a buffer solution comprising trehalose, withdrawing the biological molecules or cells from the buffer solution in an environment that does not include oxygen to generate lyo-stabilized biological molecules or cells, and storing the lyo-stabilized biological molecules or cells. The devices include a motor that lowers a horizontal member having a clamp for receiving a substrate toward a solvent reservoir and raises the horizontal member having the clamp up and away from the solvent reservoir.

19 Claims, 10 Drawing Sheets

(56) References Cited

OTHER PUBLICATIONS

Roos, Yrjö et al., "Phase Transitions of Mixtures of Amorphous Polysaccharides and Sugars," Biotechnology Progress (1991), vol. 7, Iss. 1, pp. 49-53; DOI: 10.1021/bp00007a008. (Abstract Only).
Scriven, L. E. et al., "The Marangoni Effects," Nature, (1960) vol. 187, pp. 186-188; DOI: 10.1038/187186a0.
Chakraborty et al.; "Cryopreservation of spin-dried mammalian cells", PLOS One, vol. 6, Issue 9, Article No. e24916, pp. 1-8 (Sep. 2011).
Buchanan et al.; "Preservation of differentiation and clonogenic potential of human hematopoietic stem and progenitor cells during lyophilization and ambient storage", PLOS One vol. 5, Issue 9, Article No. e12518, pp. 1-11 (Sep. 2010).
Kaushik et al.; "Why is trehalose an exceptional protein stabilizer?: An analysis of the thermal stability of proteins in the presence of the compatible osmolyte trehalose", The Journal of Biological Chemistry, vol. A 278, No. 29, pp. 26458-26465 (2003).
Caldas et al.; "Thermoprotection by glycine betaine and choline", Microbiology, vol. 145, pp. 2543-2548 (1999).
Jahn et al.; "Osmotic effect of choline and glycine betaine on the gills and hepatopancreas of the *Chasmagnathus granulata* crab submitted to hypersomotic stress", Journal of Experimental Marine Biology and Ecology, vol. 334, pp. 1-9 (2006).
International Search Report and Written Opinion of the International Searching Authority issued in PCT/US2017/022299, dated Jun. 20, 2017; ISA/KR.
Li, Rongheng et al., "Understanding Temperature Profiles Experienced by Biological Samples During a Hybrid Vitrification Technique." Proceedings of the ASME 2013 International Mechanical Engineering Congress and Exposition, Paper No. IMECE2013-63947, pp. 1-3 (2013).

\* cited by examiner

No substrate modification (No collagen)     Substrate modification with collagen Substantially green Mixture of red and green Mixture of red and green Substantially red Cells are red with blue nuclei

SURFACE TENSION MEDIATED LYO-PROCESSING TECHNIQUE FOR PRESERVATION OF BIOLOGICS

CROSS-REFERENCE TO RELATED APPLICATIONS

This application is a U.S. National Phase Application under 35U.S.C. 371 of International Application No. PCT/US2017/022299 filed on Mar. 14, 2017. This application claims the benefit of U.S. Provisional Application No. 62/307,761, filed on Mar. 14, 2016. The entire disclosures of the above applications are incorporated herein by reference.

GOVERNMENT RIGHTS

This disclosure was made with government support under CBET-1510072 awarded by the National Science Foundation. The Government has certain rights in the invention.

FIELD

The present disclosure relates to devices and methods for preserving biological molecules and cells in a dry state.

BACKGROUND

This section provides background information related to the present disclosure which is not necessarily prior art.

Current methods for storing and transporting cells include cryopreservation. However, cryopreservation is costly to perform and maintain due to high energy requirements and strict temperature constraints, which must be maintained to avoid cell death or degradation. Lyo-(dry)-preservation has been explored as an energy-efficient alternative to cryo-preservation. Lyo-preservation relies on a creation of a low molecular mobility "glass" having low moisture content. However, lyo-processing complex biomolecules and cellular material remains a considerable challenge. When it comes to lyo-processing, non-uniform moisture distribution in the desiccated matrix has been theorized to be a reason behind the failure to preserve cells at desiccated state. Non-uniform distribution of moisture in a desiccated matrix can create high molecular reactivity spots in desiccated cells allowing for degradative reactions to continue while in a desiccated state.

Lyo-processing has relied on desiccation of biologics as sessile droplets in a passive drying environment. One of the most important processing bottlenecks in lyo-processing (drying) of mammalian cells is creation of a uniformly desiccated product, where cellular components are desiccated uniformly. A lack of uniformity in moisture content can have a detrimental effect on cellular viability. In recent years, microwave-based and spin-drying based techniques have been implemented to uniformly process mammalian cells. While both of these techniques resulted in an improvement in sample uniformity in comparison with desiccation of sessile droplets, further improvement is required to improve upon microscale non-uniformity that exists in desiccated samples formed by conventional techniques.

SUMMARY

This section provides a general summary of the disclosure, and is not a comprehensive disclosure of its full scope or all of its features.

The present technology provides a method for lyo-processing a biological material. In certain aspects, the method includes generating a layer of the biological material on a substrate; submerging the substrate in a lyo-processing solution comprising a lyoprotectant; withdrawing the substrate from the lyo-processing solution; and contacting the biological material with an inert gas as the substrate is withdrawn from the solution to generate a lyo-stabilized biological material on the substrate. The biological material can be a biological material, a cell, a plurality of cells or a plurality of biological molecules. The lyo-stabilized biological material can be stored at ambient temperature or at cryogenic temperatures.

In various aspects, the generating a layer of the biological material on a substrate includes generating a cell monolayer on a substrate.

In various aspects, the generating a cell monolayer on a substrate includes disposing a layer of an adhesion matrix on the substrate and culturing cells on the adhesion matrix. In various aspects In various aspects, the adhesion matrix includes collagen, fibronectin, gelatin, laminin, entactin, or a combination thereof.

In various aspects, the cell monolayer includes cells selected from the group consisting of human hepatocellular carcinoma cells (HepG2), human epithelial cells (HeLa), human airway epithelial cells (HBEC3-KT), Chinese hamster ovary cells (CHO), baby hamster kidney cells (BHK), human embryonic kidney cells (HEK 293), mouse brain tissue cells (Neuro-2a), mouse embryotic fibroblast cells (NIH-3T3), mouse macrophage cells (J774), rat pheochromocytoma cells (PC12), *Drosophila melanogaster* cells (Kc 167), primary human hepatocyltes, primary human keratinocytes, primary mouse hepatocytes, UACC-810 breast cancer cells, MCF-7 breast cancer cells, mesenchymal stem cells (MSCs), and combinations thereof.

In various aspects, the generating a layer of the biological material on a substrate includes generating a monolayer of a biological molecule on the substrate, wherein the biological molecule is selected from the group consisting of a protein, a polypeptide, a peptide, an antibody, an antibody fraction, a nucleic acid, and combinations thereof.

In various aspects, wherein the lyo-protectant of the lyoprocessing solution is selected from the group consisting of be trehalose, maltose, sucrose, glucose, cellarabinose, ribose, fucose, talose, tagatose, fructose, galactose, isomaltose, nystose, maltotetraose, maltopentaose, maltohexaose, maltoheptaose, dextran, maltodextrose, xylobiose, mannitol, heptose, maltodextrin, hydroxyethyl starch, polyglycolic acid, inulin, fructo-oligosaccharides, galacto-oligosaccharides, mannan-oligosaccharides, lactose, cyclodextrins, hydroxyl propyl methyl cellulose, polysucrose and combinations thereof.

In various aspects, the lyo-processing solution is a buffer solution including a buffer with a pH of greater than or equal to about 6.5 to less than or equal to about 8.0, greater than or equal to about 500 mM to less than or equal to about 1.9 M trehalose, greater than or equal to about 5 mM to less than or equal to about 100 mM betaine, and greater than or equal to about 5 mM choline to less than or equal to about 200 mM choline.

In various aspects, the buffer solution further includes a salt selected from the group consisting of $K_2HPO_4$, $KH_2PO_4$, $Ca(H_2PO_4)_2$, $CaHPO_4$, $Ca_3(PO_4)_2$, $Ca_5(PO_4)_3(OH)$, and combinations thereof, wherein the salt has a total concentration of greater than or equal to about 100 µM to less than or equal to about 2 mM.

In various aspects, the buffer solution further includes a sugar polyol selected from the group consisting of glycerol, erythriol, threitol, arbitol, xylitol, ribitol, mannitol, sorbitol, glactitol, fusitol, iditol, inositol, volemitol, isomalt, maltitol, lactitol, maltotiitol, maltotetraitol, polyglycitol, polyethylene glycol, and combinations thereof, wherein the sugar polyol has a concentration of greater than or equal to about 10 µM to less than or equal to about 500 mM.

In various aspects, the withdrawing the substrate from the solution includes withdrawing the substrate from the lyo-processing solution at a rate of greater than or equal to about 5 mm/min to less than or equal to about 500 mm/min.

In various aspects, the inert gas is selected from the group consisting of $N_2$, He, Ne, Ar, Kr, Xe, and combinations thereof.

In various aspects, the contacting the biological material with an inert gas as it is withdrawn from the solution includes contacting the biological material with an insert gas at pressure of greater than or equal to about 5 psi to less than or equal to about 25 psi.

The present technology also provides another method for lyo-processing biological molecules or cells. In certain aspects, the method includes submerging the biological molecules or cells in a lyo-processing solution comprising trehalose, betaine, and choline, wherein the lyo-processing solution is substantially free of $Na^+$. The method also includes withdrawing the biological molecules or cells from the lyo-processing solution in an environment that is substantially free of oxygen to generate lyo-stabilized biological molecules or cells; and storing the lyo-stabilized biological molecules or cells.

In various aspects, the biological molecules or cells are disposed on a substrate and the submerging the biological molecules or cells includes submerging the substrate in the lyoprocessing solution.

In various aspects, the storing the lyo-stabilized biological molecules or cells includes storing the lyo-stabilized biological molecules or cells at ambient temperature.

In various aspects, the withdrawing the biological molecules or cells from the lyo-processing solution in an environment substantially free of oxygen includes withdrawing the biological molecules or cells from the lyo-processing solution at a rate of greater than or equal to about 5 mm/min to less than or equal to about 500 mm/min and contacting the biological molecules or cells with an inert gas selected from the group consisting of $N_2$, He, Ne, Ar, Kr, Xe, and combinations thereof, as the biological molecules or cells are withdrawn from the buffer solution.

In various aspects, the method is performed to lyophilize biological molecules selected from the group consisting of a protein, a polypeptide, a peptide, an antibody, an antibody fraction, a nucleic acid, and combinations thereof, and the contacting the biological molecules or cells with an inert gas includes contacting the biological molecules with an inert gas having a pressure of less than or equal to about 25 psi.

In various aspects, the method is performed to lyophilize a plurality of cells, and the contacting the biological molecules or cells with an inert gas comprises contacting the cells with an inert gas having a pressure of less than or equal to about 15 psi.

Also, in other aspects, the present technology provides a device for lyo-processing biological molecules or cells. The device optionally includes a vertical support post supporting a horizontal member comprising a clamp for receiving a substrate, the horizontal member being configured to move or slide along the vertical support post; a draw line coupled to the horizontal member; a motor engaged with the draw line; a solution reservoir positioned below the clamp; and a gas manifold disposed between the solution reservoir and the horizontal member. The motor lowers and raises the horizontal member, such that, when a substrate is accepted by the clamp, the motor moves the substrate downward into the solution reservoir and then moves the substrate upward out of the solution reservoir. An inert gas flows out of the gas manifold and onto the substrate as the substrate moves upward out of the solution reservoir.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
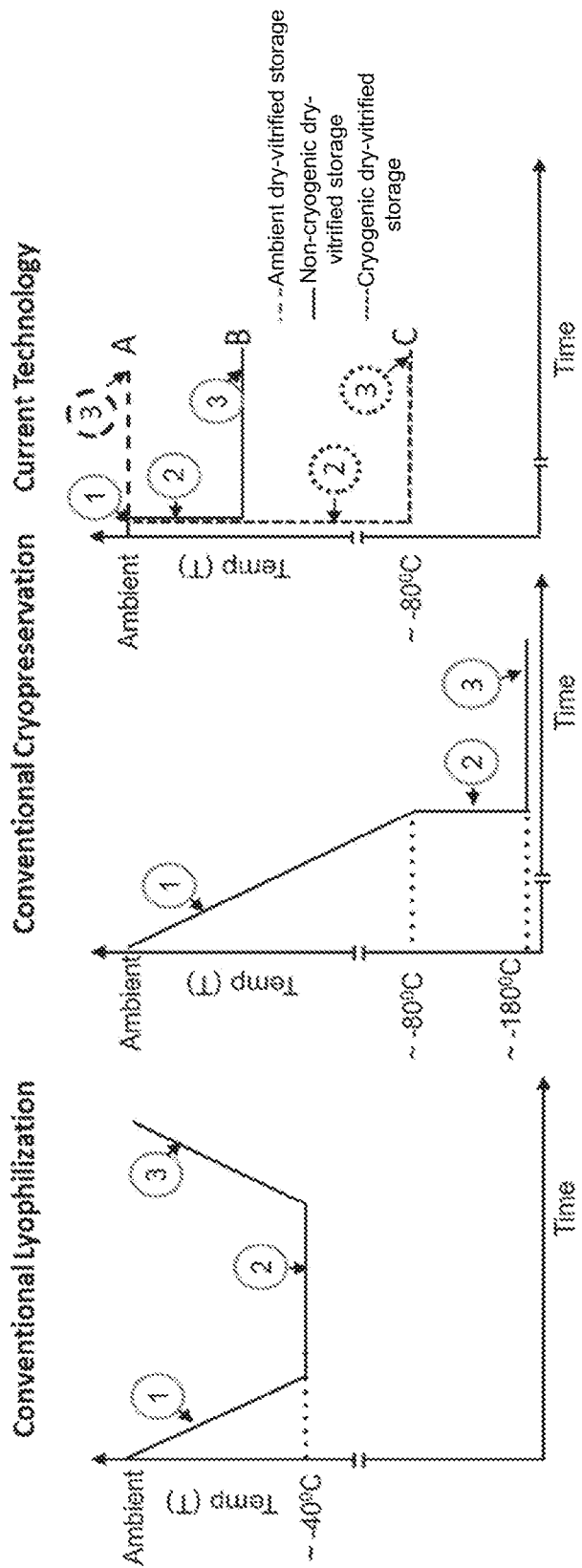
FIG. 1A is a diagram showing three phases involved in a conventional lyophilization process.
FIG. 1B is a diagram showing three phases involved in a conventional cryopreservation process.
FIG. 1C is a diagram showing three phases involved in a preservation process according to certain aspects of the present technology.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges. As referred to herein, ranges are, unless specified otherwise, inclusive of endpoints and include disclosure of all distinct values and further divided ranges within the entire range. Thus, for example, a range of "from A to B" or "from about A to about B" is inclusive of A and of B.

Example embodiments will now be described more fully with reference to the accompanying drawings.

The present technology provides a surface tension-mediated lyo-processing method for stabilization and preservation of biological materials. Whereas in lyophilization samples are cooled to generate ice crystals and then desiccated (dried) under low pressure (or vacuum) to sublime the ice crystals to create a desiccated and vitrified (i.e., converted into glass) matrix, in the tension-mediated lyo-processing method a desiccated vitrified matrix is directly created which can be stable at ambient temperature as well as low temperatures. Unlike in lyophilization where samples are cooled first and then dried using sublimation, the current tension-mediated lyo-processing method is a composite low temperature preservation method, which involves drying first and then cooling to generate lyo-stabilized biological materials. As used herein, "lyo-stabilized" materials are dry-vitrified and dry-stabilized materials that are stable at ambient temperature as well as at low temperatures.

FIGS. 1A-1C are provided to demonstrate distinctions between the current technology and conventional lyophilization and cryopreservation methods. As shown in FIG. 1A, conventional lyophilization includes 3 phases: phase 1—a cooling phase where the temperature is lowered to induce ice formation in a matrix; phase 2—a primary drying phase, wherein temperature is held constant and ice crystals are sublimed to create a "cake-like" structure in the matrix; and phase 3—a secondary drying phase, wherein the temperature is slowly increased under a low pressure/inert environment to complete drying. As shown in FIG. 1B, conventional cryopreservation includes 3 phases: phase 1—a controlled rate cooling phase, wherein temperature is lowered at a controlled rate to induce extracellular ice formation; phase 2—a fast cooling phase, wherein upon reaching cryogenic temperature (−80° C.), samples are quenched in liquid nitrogen (−196° C.) or at a vapor phase (−180° C.); and phase 3—a cryogenic storage phase, wherein samples are maintained in an environment having a cryogenic storage temperatures. FIG. 1C shows the current "hybrid" surface tension-mediated lyo-processing method, which also includes 2 or 3 phases: phase 1—dry-vitrification of samples using surface tension mediated method described herein; phase 2—fast cooling of a dry vitrified sample to either (1) non-cryogenic temperatures, or (2) cryogenic temperatures; and phase 3—a storing phase, wherein samples are maintained in an environment having a non-cryogenic or cryogenic storage temperature. In line A of FIG. 1C, after phase 1, a dry-vitrified sample remains at ambient temperature for non-cryogenic storage at ambient temperature. No fast cooling phase is required. In line B, after phase 1, a dry-vitrified sample is placed immediately into an environment having the storage temperature, such as a 4° C. or −20° C. Alternatively, the dry-vitrified sample may be placed on a pre-cooled surface for from greater than or equal to about 30 seconds to less than or equal to about 24 hours (or longer) to allow for heat transfer prior to placing the dry vitrified sample into a non-cryogenic storage temperature. In line C, after phase 1, a dry-vitrified sample is placed immediately into an environment having a cryogenic storage temperature, such as −80° C., −196° C., or −269° C. Alternatively, the dry-vitrified sample may be placed on a pre-cooled surface as described above prior to placing the dry vitrified sample into storage at a cryogenic temperate.

As used herein, "biological materials" include cells and biological molecules. The surface tension-mediated lyo-processing method relies on a "shedding" of moisture from a defined surface when the surface is brought to an interface of two fluid systems having significant difference in surface tension and viscosity. Here, biological materials attached to a substrate are exposed to an interface of a solution including a lyoprotectant and an inert gas. The interplay of surface tension and evaporation on a surface of the substrate creates a highly desiccated (and uniform) film of the lyoprotectant on the surface of the biological material. Formation of a uniform glassy protective layer of the lyoprotectant over the cellular material helps in preserving the biological material following exposure to environments with extremely low moisture contents. The current method provides a low cost of storage and transportation relative to conventional cryopreservation techniques and does not require a vacuum. The method can be performed to dry-preserve biological molecules and cells and provides a uniform processing outcome in regard to spatial uniformity of moisture content.

Figure 2:
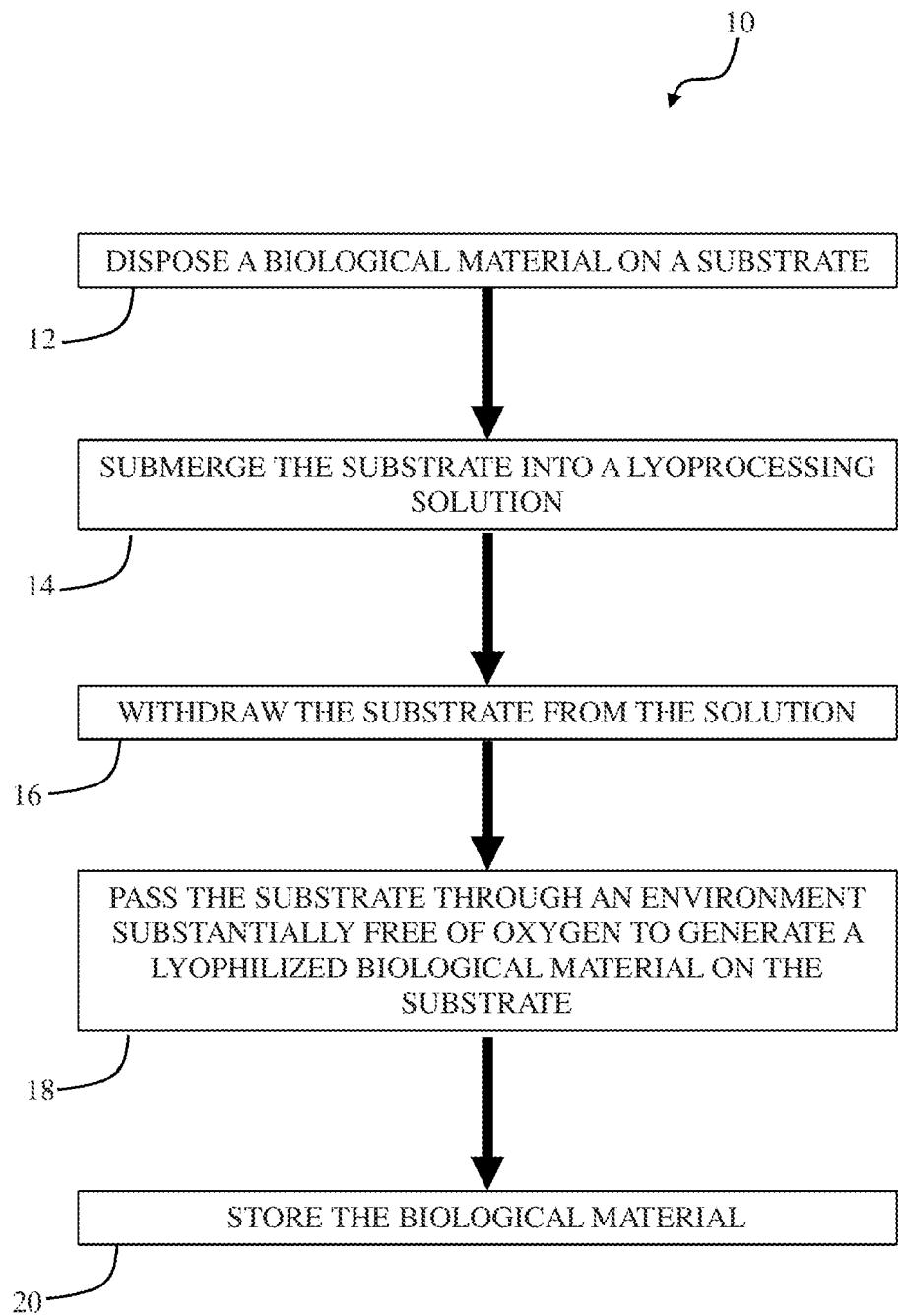
FIG. 2 is a flow chart describing a method for lyo-processing a biological material in accordance with certain aspects of the present technology.

With reference to FIG. 2, the current technology provides a method 10, i.e., a surface tension mediated method, for lyo-processing a biological material. The biological material can be biological molecules, such as, for example, proteins, protein fragments, polypeptides, peptides, antibodies, nucleic acids, i.e., deoxyribonucleic acid (DNA) and ribonucleic acid (RNA), and combinations thereof, or cells, or cellular components, or a combination of biological molecules and cells. Non-limiting examples of biological molecules that can be lyo-processed according to the current technology include lysozyme, tetracycline, yeast frataxin (Yfh1), late embryogenesis abundant (LEA) protein type 2, 3, and 6, antibodies, antibody fragments, and combinations thereof. The cells can be eukaryotic cells, such as from yeasts, mammals (including human), reptiles, amphibians, birds, and insects; prokaryotic cells, such as bacteria; viruses; or a combination thereof. Non-limiting examples of eukaryotic cells that can be lyoprocessed using the method 10 include human hepatocellular carcinoma cells (HepG2), human epithelial cells (HeLa), human airway epithelial cells (HBEC3-KT), Chinese hamster ovary cells (CHO), baby hamster kidney cells (BHK), human embryonic kidney cells (HEK 293), mouse brain tissue cells (Neuro-2a), mouse embryotic fibroblast cells (NIH-3T3), mouse macrophage cells (J774), rat pheochromocytoma cells (PC12), *Drosophila melanogaster* cells (Kc 167), primary human hepatocyltes, primary human keratinocytes, primary mouse hepatocytes, breast cancer cells (UACC-810, MCF-7), mesenchymal stem cells (MSCs), and combinations thereof. However, it is understood that any biological material that can be immobilized on a substrate (as described below) can be lyo-processed according to the present technology.

As shown in box 12, the method 10 includes disposing a layer of the biological material on a substrate. In various aspects, the layer is a monolayer. Disposing a layer of the biological material on the substrate include attaching the biological material to the substrate (such as, for example, attaching molecules or cells to the substrate) and generating a layer of the biological material on the substrate (such as, for example, disposing/attaching cells on the substrate and allowing the cells to divide and grow across the substrate to form the layer). The substrate may be, for example, glass or plastic. In one embodiment, the substrate is a slide or slide coverslip. The slide or slide coverslip may be formed of an inorganic material, such as glass, or an organic polymeric material. Although the biological material can be disposed directly on the substrate, in many embodiments, the biological material is disposed on an adhesion matrix disposed on the substrate. The adhesion matrix can serve to protect delicate biological materials from mechanical forces that come into play at an interface of two fluid environments having significant differences in surface tension and viscosity. Accordingly, the adhesion matrix provides some microscale elasticity, which protects the biological material from destructive mechanical forces. Therefore, the adhesion matrix has a degree of elasticity and is not rigid. Non-limiting examples of materials that provide a suitable adhesion matrix include antibodies, antibody fragments, collagens, cadherins, alginate, avidin, biotin, fibronectins, gelatins, hydrogels, laminins, entactins, elastins, proteoglycans, aliginic acid, or combinations thereof. A commercial available adhesion matrix is MATRIGEL® extracellular matrix (Corning Inc.; Tewksbury, Mass.), which includes laminin, collagen IV, entactin, heparin sulfate proteoglycan, and a plurality of growth factors. Moreover, various substrates have or are modified to have a portion that is hydrophobic or hydrophilic, e.g., hydrophobic or hydrophilic slides or coverslips, wherein the biological material is disposed directly or indirectly (by way of an adhesion matrix) to the hydrophobic or hydrophilic portion.

In various embodiments, the method 10 includes disposing a layer of an adhesion matrix on the substrate and depositing a layer of biological molecules on the adhesion matrix or culturing a layer of cells on the adhesion matrix. Disposing a layer of the adhesion matrix on the substrate can be performed by any method known in the art, including by spin coating, dip coating, rocking and pipetting as a non-limiting examples. In one embodiment, a droplet of solution comprising an adhesion matrix component is disposed on a slide, which is then placed on an elliptical rocker to generate a uniform layer of adhesion matrix on the slide.

As shown in box 14, the method 10 also includes submerging the substrate into a lyo-processing solution. The lyo-processing solution comprises a buffer and a lyoprotectant. Accordingly, in various aspects, the lyo-processing solution is a buffer solution. The buffer can include any buffering agent that provides a pH of greater than or equal to about 6.5 to less than or equal to about 8.0. Non-limiting examples of suitable buffering agents include piperazine-N, N′-bis(2-ethanesulfonic acid) (PIPES), (3-(N-morpholino) propanesulfonic acid) (MOPS), (4-(2-hydroxyethyl)-1-piperazineethanesulfonic acid) (HEPES), 2-[(2-Hydroxy-1,1-bis(hydroxymethyl)ethyl)amino]ethanesulfonic acid (TES), tris(hydroxymethyl)aminomethane (TRIS), tris(hydroxymethyl)aminomethane hydrochloride (TRIS-HCL), N-[Tris(hydroxymethyl)methyl]glycine (TRICINE), 3-[4-(2-Hydroxyethyl)-1-piperazinyl]propanesulfonic acid (HEPPS), N,N-Bis(2-hydroxyethyl)glycine (BICINE), N-[Tris(hydroxymethyl)methyl]-3-aminopropanesulfonic acid (TAPS), and phosphate buffered saline (PBS).

In some aspects of the current technology, the buffer solution additionally contains a supplemental component and/or a reducing reagent. Non-limiting examples of supplemental components include citrate, trimethylamine/HCl, EDTA, EGTA, 6-hydroxy-2,5,7,8-tetramethylchroman-2-carboxylic acid (trolox), and combinations thereof. Non-limiting examples of reducing agents include dithiothreitol (DTT), tris(2-carboxyethyl)phosphine (TCEP), 2-mercaptoethanol, and combinations thereof.

The lyoprotectant is a glass-forming sugar. As non-limiting examples, the glass forming sugar may be trehalose, maltose, sucrose, glucose, cellarabinose, ribose, fucose, talose, tagatose, fructose, galactose, isomaltose, nystose, maltotetraose, maltopentaose, maltohexaose, maltoheptaose, dextran (from about 3000 Da to about 2,000,000 Da, e.g., dextran-40), maltodextrose (and maltodextrose equivalents or derivatives that share the same backbone structure as maltodextrose), xylobiose, mannitol, heptose, maltodextrin, hydroxyethyl starch (e.g., pentastarch), polyglycolic acid, inulin, fructo-oligosaccharides, galacto-oligosaccharides, mannan-oligosaccharides, lactose, cyclodextrins, hydroxyl propyl methyl cellulose, polysucrose (e.g., FICOLL® polysucrose; GE Healthcare, Chicago, Ill.) and combinations thereof, as non-limiting examples. In various embodiments, the lyo-processing solution includes greater than or equal to about 500 mM to less than or equal to about 1.9 M of the glass forming sugar. In some embodiments, the glass-forming sugar is trehalose. Optionally, glass enhancers containing a carboxylic acid and/or carboxylic acid derivative can be added to the lyo-processing solution. Non-limiting examples of suitable carboxylic acids include acetic acid, ascorbic acid, maleic acid, oxalic acid, malonic acid, malic acid, succinic acid, citric acid, gluconic acid, glutamic acid, glutathione, salts therefore, and combinations thereof. Moreover, adjunct materials may be included in conjunction with the glass-forming sugar. Such adjunct materials include various water soluble polymers that are closely related to polyethylene glycol (PEG), such as, for example, propylene glycol and polyvinylpyrrolidone, and proteins, such as, for example, albumin, (e.g., bovine serum albumin (BSA)), gelatin, chitosan, chitosan derivatives, alginate, and collagen, and combinations thereof.

The lyo-processing solution has a temperature of from greater than or equal to about 15° C. to less than or equal to about 40° C., or from greater than or equal to about 25° C. to less than or equal to about 37° C. In one embodiment, the temperature of the lyo-processing solution is about 37° C.

The lyo-processing solution prevents or minimizes nanoscale molecular activity by avoiding the presence of small molecular size ions. Therefore, in certain aspects, the lyo-processing solution is substantially free of sodium ions ($Na^+$). As used herein, when a composition is "substantially free" of a component, the component is not intentionally added to the composition, such that the component is present in the composition only in residual or trace amounts, if at all. For example, a composition that is substantially free of a component may include a concentration of the component of less than or equal to about 5% (w/v or v/v), less than or equal to about 4% (w/v or v/v), less than or equal to about 3% (w/v or v/v), less than or equal to about 2% (w/v or v/v), less than or equal to about 1% (w/v or v/v), or less than or equal to about 0.5% (w/v or v/v). The term "substantially free" includes "completely free," i.e., there is none of the component in the composition. Nonetheless, larger ions, such as potassium ions ($K^+$) or calcium ions ($Ca^{2+}$), may be included in the lyo-processing solution in small concentrations to discourage proper ionic balance and to prevent the presence of smaller ions. Without being bound by theory, it is believed that larger ions, such as $K^+$ and $Ca^{2+}$, are advantageous over $Na^+$ due to a decreased likelihood of transport by diffusion and ion channels, which could be damaging to cells. Accordingly, the lyo-processing solution can comprise salts, such as $K_2HPO_4$, $KH_2PO_4$, $Ca(H_2PO_4)_2$, $CaHPO_4$, $Ca_3(PO_4)_2$, $Ca_5(PO_4)_3(OH)$, and combinations thereof at a total concentration of greater than or equal to about 100 µM to less than or equal to about 2 mM.

In various embodiments, the lyo-processing solution further comprises an osmolite. Suitable osmolites include betaine, choline, arbohydrates, starch, proline, ectoine, trimethylamine N-oxide (TAMO), 3,3-Dimethyl-1-butanol, sarcosine, glycine, myo-inositol, taurine, serine, threonine, glycine-betaine, choline saccharinate, choline lactobionate, trimethylglycine, glycerylphosphorylcholine, sericin, protein, vitamins, and combinations thereof by way of example. The osmolite(s) may be included at a trace amount, such as 1 nM to 1 µM (especially in regard to TAMO and 3,3-dimethyl-1-butanol), or at a concentration of greater than or equal to about 5 mM to less than or equal to about 500 mM. In some embodiments, the lyo-processing solution includes greater than or equal to about 5 mM to less than or equal to about 100 mM betaine and/or greater than or equal to about 5 mM choline to less than or equal to about 200 mM choline. The lyo-processing solution can also be supplanted with sodium azide and/or potassium azide at a concentration of from greater than or equal to about 0.005% (w/v) to 0.5% (w/v), or from greater than or equal to about 0.01% (w/v) to less than or equal to about 0.1% (w/v).

Sugar polyols may be added to the lyo-processing solution to suppress short-length scale, high-frequency dynamics of vitrified matrices formed by the glass-forming sugars, especially when it is expected that the biological material will be stored at less than or equal to about −80° C. (a typical cryogenic storage temperature). Non-limiting examples of suitable sugar polyols include glycerol, erythriol, threitol, arbitol, xylitol, ribitol, mannitol, sorbitol, glactitol, fusitol, iditol, inositol, volemitol, isomalt, maltitol, lactitol, maltotiitol, maltotetraitol, polyglycitol, polyethylene glycol, and combinations thereof. Therefore, the lyo-processing solution may also optionally comprise at least one sugar polyol at a concentration of greater than or equal to about 10 µM to less than or equal to about 500 mM. Although the sugar polyol is most useful when the stabilized biological material is stored at less than or equal to about −80° C., the sugar polyol may be included at any suitable storage temperature, non-cryogenic (greater than or equal to about −79° C.) or cryogenic (less than or equal to about −80° C.), from less than or equal to about ambient temperature (about 27° C.) to greater than or equal to about −269° C. (the temperature of liquid He). It is understood that this temperature range includes storage in liquid nitrogen (at a temperature of about −196° C.).

Surfactants may also be added to the lyo-processing solution as surface tension modulators. In particular, non-ionic surfactants can be used to modulate surface tension. Exemplary surfactants that are suitable for use in the lyo-processing solution as surface tension modulators include n-octyl-β-glucoside, n-dodecyl-β-D-maltoside, hexaoxyethylene dodecyl ether, polysorbates (e.g., TWEEN® 20 polysorbate), t-octylphenoxypolyethoxyethanol (e.g., TRITON™ X-100 t-octylphenoxypolyethoxyethanol), polyoxyethylene-polyoxypropylene copolymers, such as Poloxamer 407, Poloxamer 338, Poloxamer 237, Poloxamer 188, and Poloxamer 124, which are available as PLURONIC® F127NF poloxamer, PLURONIC® F108NF poloxamer, PLURONIC® F87NF poloxamer, PLURONIC® F68NF poloxamer and PLURONIC® F44N poloxamer (BASF, Florham Park, N.J.), respectively, and combinations thereof. The surfactants may be included at a concentration of greater than or equal to about 0.1 wt % to less than or equal to about 28 wt %.

With further reference to FIG. 2, in box 16 the method 10 also includes withdrawing the substrate from the lyo-processing solution. Withdrawing is performed at a controlled rate, i.e., a withdrawing velocity, to ensure that the biological material is dried appropriately. For example, the withdrawing velocity affects the thickness of the glass as the glass forms over the biological material. In various embodiments, withdrawing the substrate from the solution is performed at a rate of greater than or equal to about 5 mm/min to less than or equal to about 500 mm/min, greater than equal to about 10 mm/min to less than or equal to about 400 mm/min, greater than equal to about 20 mm/min to less than or equal to about 300 mm/min greater than equal to about 30 mm/min to less than or equal to about 200 mm/min, or greater than equal to about 50 mm/min to less than or equal to about 100 mm/min.

Additionally, in various aspects, withdrawing the substrate from the lyo-processing solution includes withdrawing the substrate from the lyo-processing solution in such a manner that the lyo-processing solution slides off of the substrate at a sufficient rate to promote drying of the biological material. In various embodiments, the method includes withdrawing the substrate such that a longitudinal axis of the substrate is, relative to the surface of the lyo-processing solution, at an angle of greater than or equal to about 30° to less than or equal to about 90°, greater than or equal to about 45° to less than or equal to about 90°, greater than or equal to about 60° to less than or equal to about 90°, greater than or equal to about 75° to less than or equal to about 90°. In one embodiment, a longitudinal axis of the substrate is orthogonal, i.e., at a 90° angle, to the surface of the lyo-processing solution.

Figure 3:
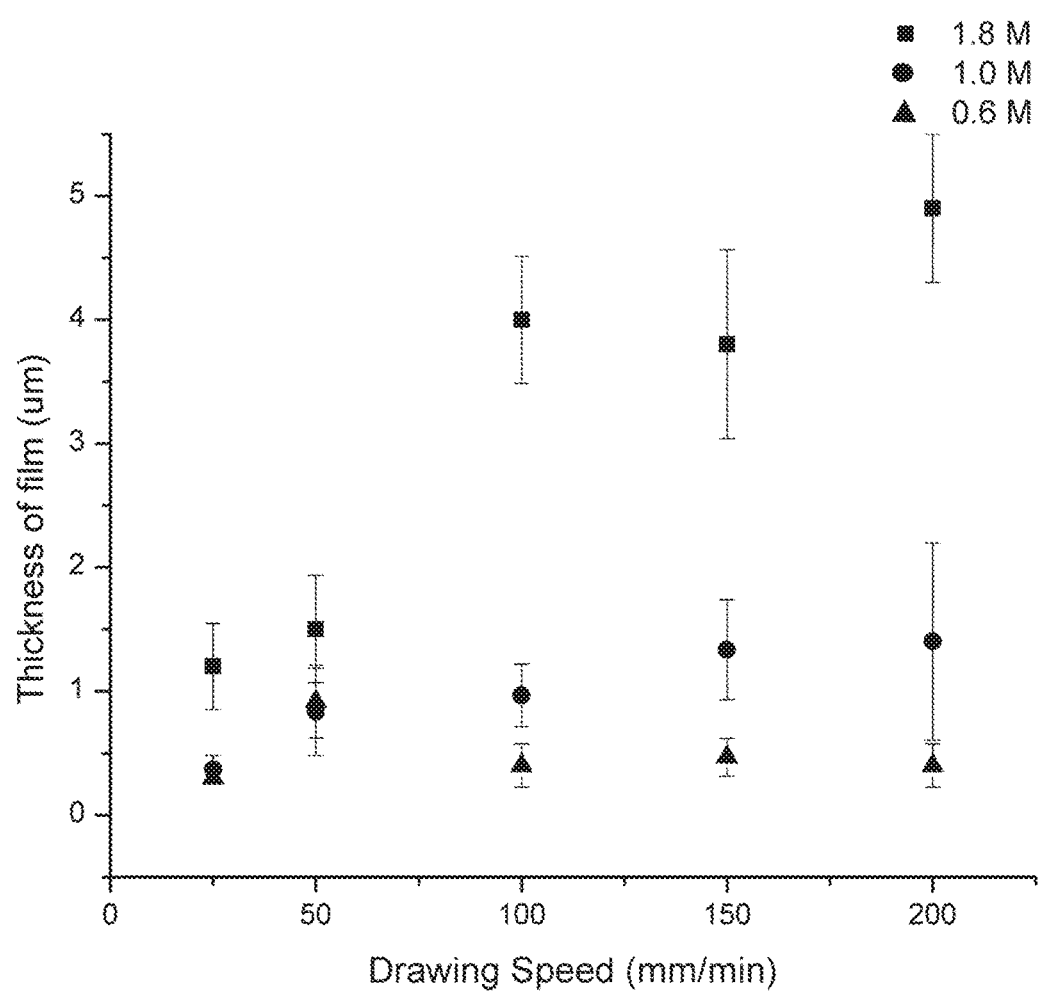
FIG. 3 is a graph that shows a relationship between glass film thickness (film thickness) and withdrawal velocity.

In box 18, the method 10 comprises contacting the substrate with (e.g., passing the substrate through) an environment that does not include or is substantially free of oxygen, i.e., an anaerobic environment, to generate a lyo-stabilized biological material on the substrate. In certain aspects, the passing the substrate through an anaerobic environment is performed concurrently with withdrawing the substrate from the lyo-processing solution. In other words, the substrate (and biological material) is withdrawn from the lyo-processing solution and immediately contacts or passes through an anaerobic environment, such that little or no oxygen contacts the biological material as it is withdrawn from the lyo-processing solution. A resulting uniform glassy protective layer of the lyoprotectant covers the biological material. The glassy protective layer has a thickness of from greater than or equal to about 500 nm to less than or equal to about 200 µm, or from greater than or equal to about 0.1 µm to less than or equal to about 5 µm. FIG. 3 is a graph that shows a relationship between glass film thickness (film thickness) and withdrawal velocity (drawing speed) for an exemplary biological material (a monolayer of cells) submerged into and withdrawn from a series of lyo-processing solutions comprising trehalose at concentrations of 0.6 M, 1.0 M, and 1.8 M. The graph shows that the withdrawal velocity influences film thickness more as the concentration of the lyoprotectant (trehalose) increases. For example, when trehalose is present at 0.6 M, the withdrawal velocity had little influence on film thickness. However, when the trehalose concentration was increased to 1.0 M, increasing the withdrawal velocity appears to coincide with an increase in film thickness. This trend continues as the trehalose concentration is increased again to 1.8 M. Here, the withdrawal velocity more than doubles as the withdrawal velocity is increased from 50 mm/min to 100 mm/min. Therefore, withdrawing the substrate from the lyo-processing solution and through the anaerobic environment can be performed at a withdrawing velocity that generates a predetermined film thickness.

In various embodiments, passing the substrate through an environment that is substantially free of oxygen (an anaerobic environment) comprises contacting the biological material with an inert gas as the substrate is withdrawn from the solution to generate a lyo-stabilized biological material on the substrate. Suitable inert gases include, as non-limiting examples, $N_2$, He, Ne, Ar, Kr, Xe, and combinations thereof.

In certain aspects, the contacting the biological material with an inert gas as it is withdrawn from the solution comprises contacting the biological material with an inert gas at pressure of greater than or equal to about 5 psi to less than or equal to about 25 psi, or greater than or equal to about 5 psi to less than or equal to about 10 psi. The pressure can be adjusted to ensure that the biological material is not "blown off" of the substrate. For example, when the biological material is a layer of biological molecules (or monolayer of biological molecules), the pressure can be less than or equal to about 25 psi. When the biological material is a layer of cells (or monolayer of cells), the pressure can be less than or equal to about 15 psi.

The anaerobic environment has a temperature of from greater than or equal to about 10° C. to less than or equal to about 25° C., or from greater than or equal to about 15° C. to less than or equal to about 20° C. In one embodiment, the temperature of the anaerobic environment is 20° C.

After this process, the biological material is lyo-stabilized on the substrate. The lyo-stabilized cells have a water content of from greater than or equal to about 0.001 g $H_2O$ per gram dry weight of the lyo-processed cells ($gH_2O/gdw$) to less than or equal to about 0.5 $gH_2O/gdw$.

In box 20, the method 10 optionally includes storing the lyo-stabilized biological material in a dry-vitrified or lyo-processed condition at non-cryogenic temperatures (about room temperature or ambient temperature to about −79° C.) or at cryogenic temperatures (less than about −80° C.). The lyo-stabilized biological material can remain disposed on the substrate during storage or the biological material can be removed from the substrate and stored in a container, such as a vial or tube. In either embodiment, storing the biological material includes storing the substrate at a temperature of room temperature or ambient temperature or below. In some embodiments, the biological material is stored at room temperature. In various embodiments, storing is performed with a fast cooling phase, wherein immediately after it is formed, the lyo-stabilized biological material is placed into storage at a desired non-cryogenic or cryogenic temperature (from ambient temperature to −269° C.). As described above, alternatively, the lyo-stabilized material is placed on a pre-cooled surface for from greater than or equal to about 30 seconds to less than or equal to about 24 hours (or longer) to allow for heat transfer prior to placing the lyo-stabilized material into storage at a non-cryogenic or cryogenic temperature.

In various aspects, the quality of biological materials lyo-stabilized according to the method 10 can be assessed by Raman spectroscopy. In particular, Raman spectra of the biological materials can be obtained before and after the method 10 is performed. Matching spectra is indicative of high quality lyo-stabilization, wherein high quality lyo-stabilization means that, after the lyo-stabilized biomaterial is reconstituted, the reconstituted biological material substantially or exactly resembles (in terms of viability, activity, function, etc.) the biological material prior to lyo-stabilization. Accordingly, the method 10 optionally includes assessing the quality of the lyo-stabilized biological material by obtaining and comparing Raman spectra of the biological material before and after lyo-stabilization. In some aspects, the method 10 yields a lyo-stabilized biological material with a Raman spectrum that matches a Raman spectrum of the biological material prior to lyo-stabilization. (INVENTOR: please confirm this paragraph and revise if necessary.)

Figures 4, 5:
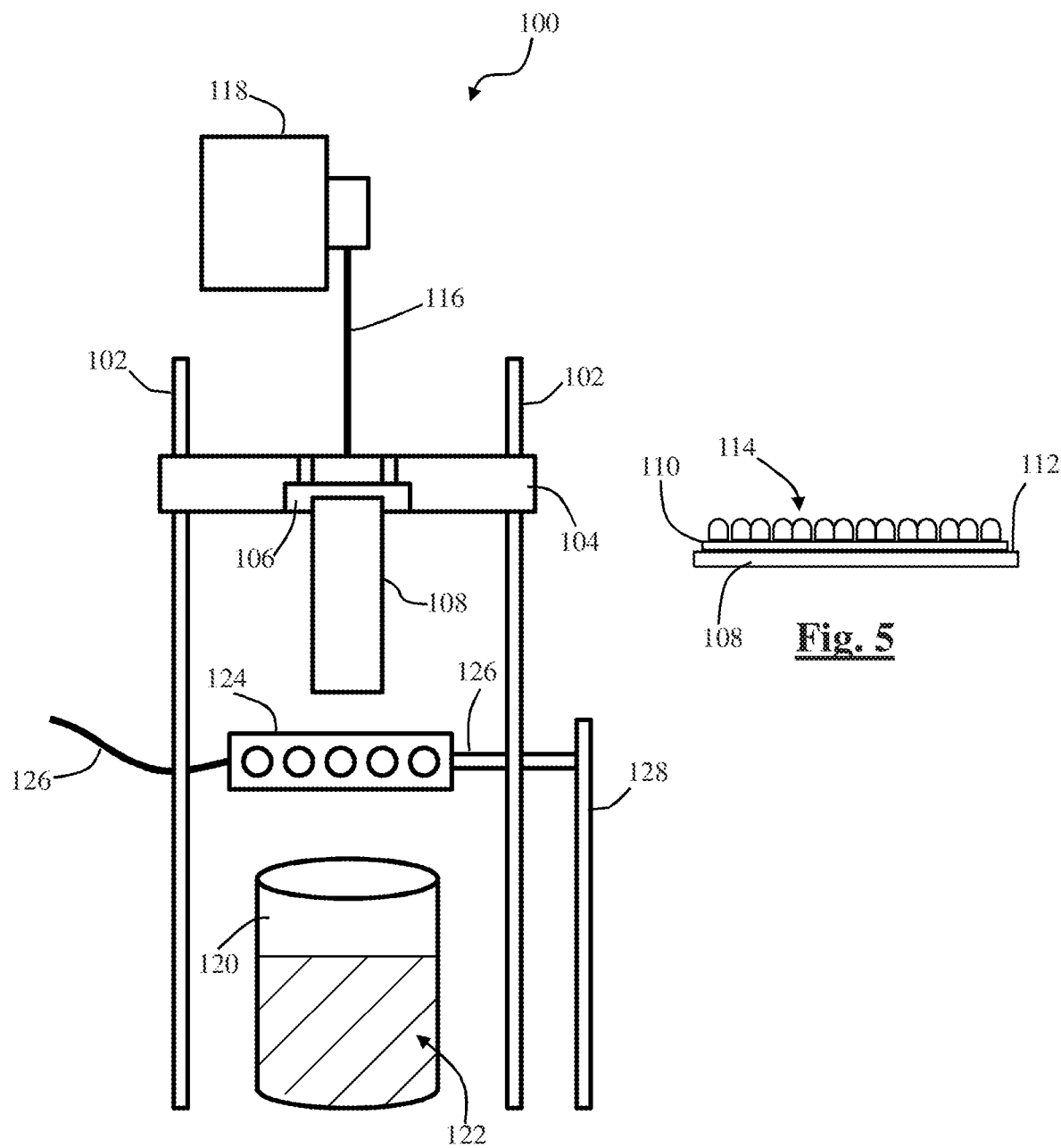
FIG. 4 is an illustration of a device according to certain aspects of the present technology.
FIG. 5 is an illustration of a substrate having a monolayer of a biological material disposed thereon prepared in accordance with certain aspects of the present technology.

The current technology also provides a device 100 for performing the method described above, as shown in FIG. 4. The device 100 comprises a first vertical support post 102 that supports a horizontal member 104. In some embodiments, as shown in FIG. 4, the device 100 includes two vertical support posts 102 that support the horizontal member 104 on opposing ends of the horizontal member 104. The horizontal member 104 comprises a retainer in the form of a clamp 106 for receiving a substrate 108. Moreover, the horizontal member 104 is configured to slide downward and upward along the vertical support post 102.

The substrate 108 is shown in more detail in FIG. 5. Here, the substrate 108 is depicted with an adhesion matrix 110 disposed on a surface 112 of the substrate 108. A monolayer of a biological material 114 is disposed directly on the adhesion matrix 110. The substrate 108, adhesion matrix 110, and biological material 114 can be any substrate, adhesion matrix and biological material described above.

Referring back to FIG. 4, the device 100 also comprises a draw line 116 coupled to the horizontal member 104 on a first end engaged with a motor 118 on an opposing second end. Therefore, the horizontal member 104 slides along the vertical support post 102 by way of the motor 118 and the draw line 116. The draw line 116 can be composed of any material that can support the horizontal member 104 and substrate 108, such as, for example, a metal wire or thread.

The device 100 also includes a solution reservoir 120 positioned below the clamp 106, such that when the clamp 106 is holding the substrate 108, the motor 118 lowers the substrate 108 into a lyo-processing solution 122 within the solution reservoir 120 and raises the substrate 108 out of the lyo-processing solution 122 at any rate described herein.

The device 100 also includes a gas manifold 124 positioned between the solution reservoir 120 and the horizontal member 104, but off-center. A gas supply line 126 supplies an inert gas to the manifold 124 from a gas source, such as, for example, a tank of inert gas. As shown in FIG. 4, the manifold 124 is held by a horizontal support member 126 that is supported by a vertical support member 128. However, any suitable means of support may be employed to hold the manifold 124 in position between the horizontal member 104 and the solution reservoir 120. The manifold 124 is positioned off center so that gas flowing out of the manifold 124 contacts the substrate 108 and biological material 114 as soon as the substrate 108 is moved upward out of the solution reservoir 120 by way of the motor 118. Put another way, the motor 118 lowers and raises the horizontal member 104, such that, when a substrate 108 is accepted by the clamp 106, the motor 118 moves the substrate 108 downward into the solution reservoir 120 and then moves the substrate 108 upward out of the solution reservoir 120, wherein an inert gas flows out of the gas manifold 124 and onto the substrate 108 as the substrate 108 moves upward out of the solution reservoir 120.

Embodiments of the present technology are further illustrated through the following non-limiting example.

EXAMPLE

A method of a surface tension mediated lyo-processing for stabilizing and preserving biological materials, including mammalian cells and cellular components, is described. The method can be extended to preserve any biological material, including therapeutic proteins, antibodies, nucleic acids, as well as other bio-conjugates. Here, the method is demonstrated on human hepatocellular carcinoma (HepG2) and Chinese hamster ovary (CHO) cells. Both HepG2 and CHO cells are known to be highly susceptible to processing stresses. Hence successful lyo-processing of HepG2 or CHO cells demonstrates that the method can be used for a wide variety of cells and other biological materials.

Substrates are prepared by a tension mediated lyo-processing technique. Substrates are generated by applying 20 mm silicone gaskets (FASTWELLS™ Reagent Barrier; Grace Bio-Labs, Bend, Oreg.) to slides, making sure a seal is well formed. 500 µL of collagen solution was added to the wells (collagen type I from rat tail) diluted to 50 µg/mL-150 µg/mL (depending on cell adhesion characteristics) in 0.02 M acetic acid. Surface tension mediated non-uniformity is broken in collagen deposition around periphery of wells by mixing and filling the entire wells. Following drying of the surface under laminar airflow for one hour, the surface was washed using phosphate buffered saline and stored in 4° C. refrigerator. Monolayers of HepG2 and CHO cells are grown on the collagen. The slides are then submerged in a lyo-processing solution comprising 1.25 M trehalose, 28 mM HEPES, and 28 mM glycerol in ultra-pure water and then withdrawn. A portion of the cells were processed using a spin-drying technique known in the art for drying cellular components.

Figure 6A:
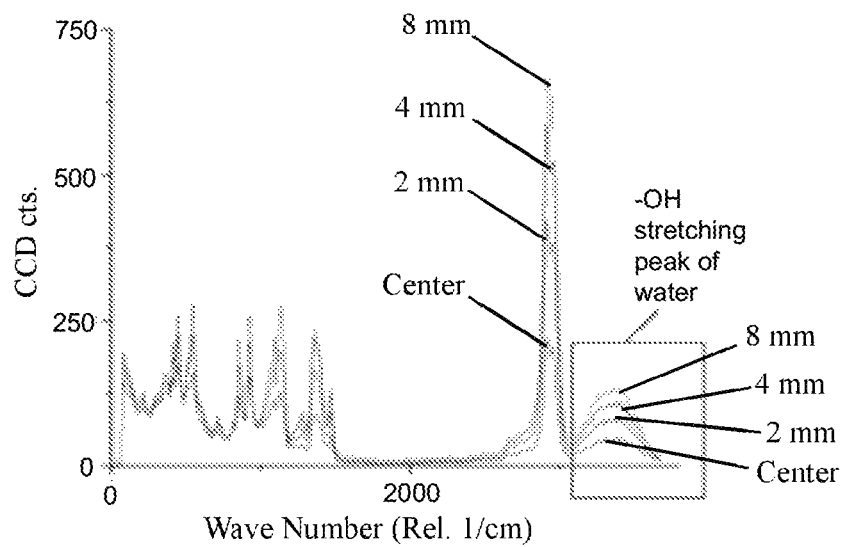
FIG. 6A shows Raman spectra for samples prepared by a comparative spin-drying method.
Figure 6B:
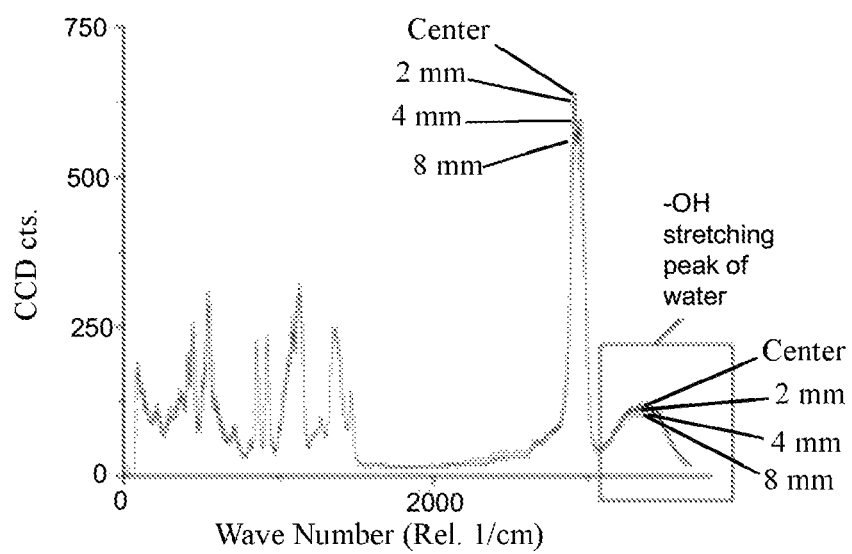
FIG. 6B shows Raman spectra for samples prepared by a tension mediated method according to the present technology.

Spatial uniformity of the moisture content of the samples lyo-processed using the method described above is compared with the samples processed using the spin-drying method. Samples were taken from the center of each substrate and from 2 mm, 4 mm, and 8 mm away from the center. A Raman micro-spectroscopic characterization scheme is undertaken where presence of water is verified by looking at an —OH stretching region of Raman spectra. An increased signal in the —OH stretching region was correlated with the increased presence of moisture. The results are shown in FIGS. 6A and 6B. FIG. 6A shows Raman spectra for samples lyo-processed using a comparative spin drying method. FIG. 6B shows Raman spectra for samples lyo-processed using the tension mediated technique according to the present technology. The Raman spectra of the samples from the center of the substrate towards the edge was compared giving special emphasis of the —OH stretching peak of water. For spin-dried samples there is a gradual increase in moisture content indicated by an increasing —OH stretching peak of water. There is no such increase (or decrease) of the —OH stretching peak of water in samples prepared by the surface tension mediated technique, which indicates uniform moisture distribution.

Figure 7A:
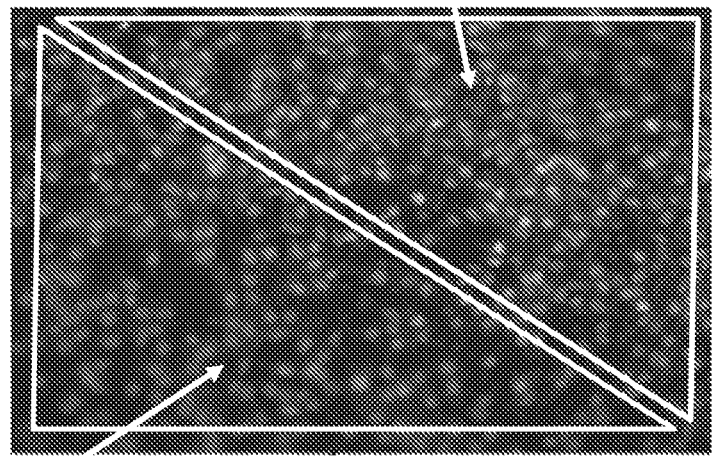
FIG. 7A is a fluorescent micrograph of a sample prepared by a comparative spin-drying method.
Figure 7B:
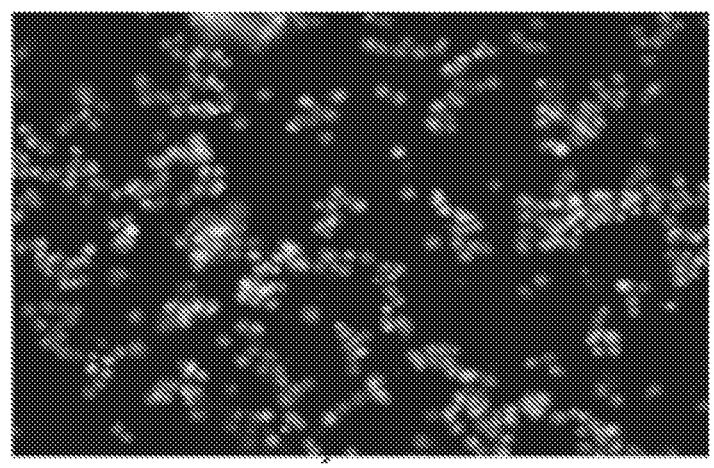
FIG. 7B is a fluorescent micrograph of a sample prepared by a tension mediated method according to the present technology.

Viability of cells lyo-processed by the spin-drying method and by the tension mediated technique is also determined. Fluorescent micrographs are collected from the same approximate location on the substrates. The location is in an area where Raman spectra showed elevated moisture content in samples prepared by the spin-drying method. Live cells are indicated in green (syto13) and dead cells are indicated in red (ethidium bromide). FIG. 7A shows results for the cells processed using the comparative spin-drying technique. FIG. 7B shows results for the cells processed using the tension mediated technique according to the present technology. Whereas a majority of the cells processed by the spin-drying method are dead, the tension mediated technique results in very few dead cells. Therefore, the tension mediated technique results in substantially higher cell viability relative to the spin-drying technique. Moreover, there is a strong correlation with the location of high moisture content as shown using the Raman spectra and the dead cells.

Figure 8A:
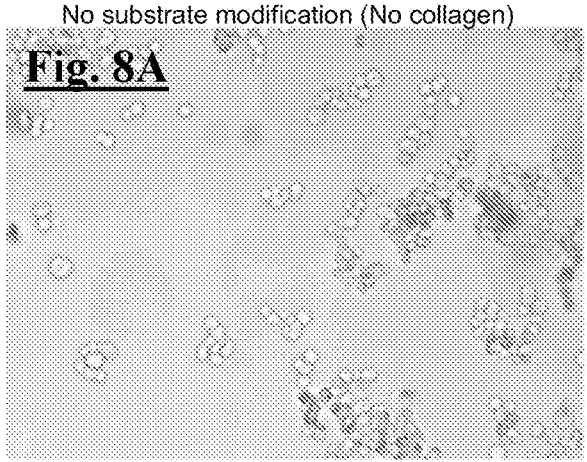
FIG. 8A is a micrograph of cells disposed on a substrate without collagen at t=0 hours.
Figure 8B:
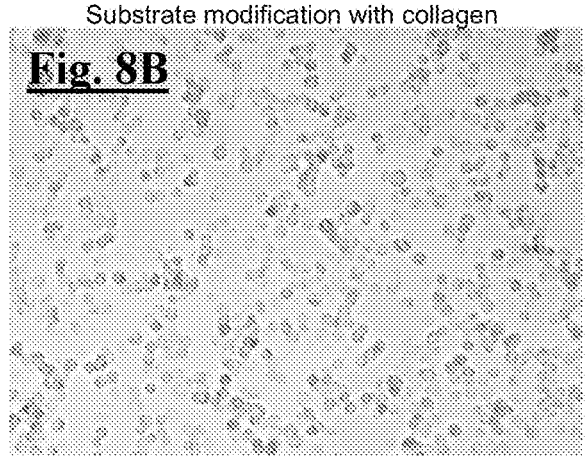
FIG. 8B is a micrograph of cells disposed on a substrate with collagen at t=0 hours.
Figure 8C:
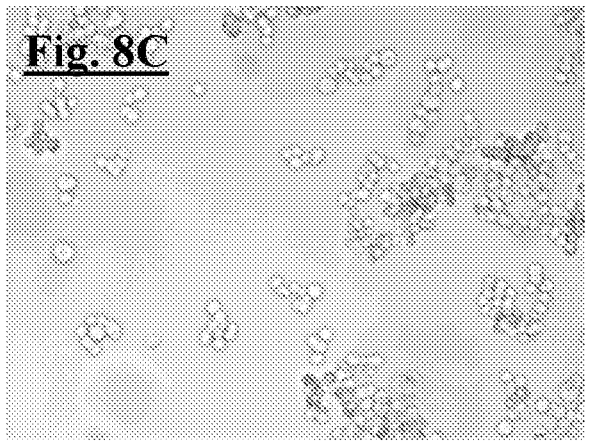
FIG. 8C is a micrograph of cells disposed on a substrate without collagen at t=3 hours.
Figure 8D:
FIG. 8D is a micrograph of cells disposed on a substrate with collagen at t=3 hours.

HepG2 cells were grown on substrates with and without collagen. Micrographs are processed for cells grown on the substrates to determine the effect that the collagen has on cellular attachment. FIGS. 8A and 8B are micrographs taken shortly after cells are disposed on the substrates, wherein the substrate of FIG. 8A is not modified and the substrate of 8B is modified with collagen. FIGS. 8C and 8D are micrographs of the same cells and substrates as FIGS. 8A and 8B, respectively, taken after 3 hours. As shown by the micrographs, collagen greatly increases the amount of cells that attach to the substrate.

Figure 9A:
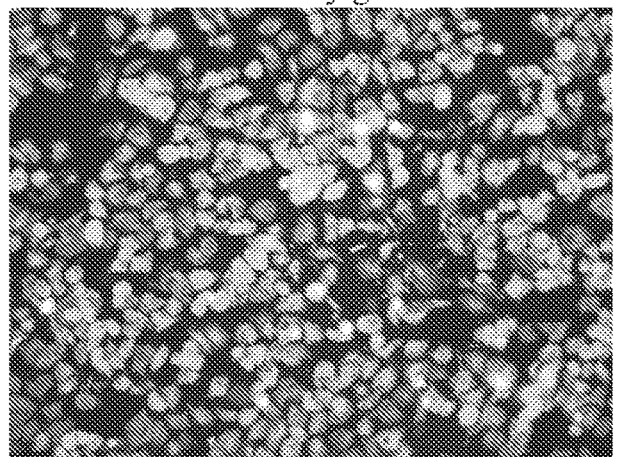
FIG. 9A is a fluorescent micrograph of a sample prepared by a tension mediated method according to certain aspects of the present technology and then rehydrated.
Figure 9B:
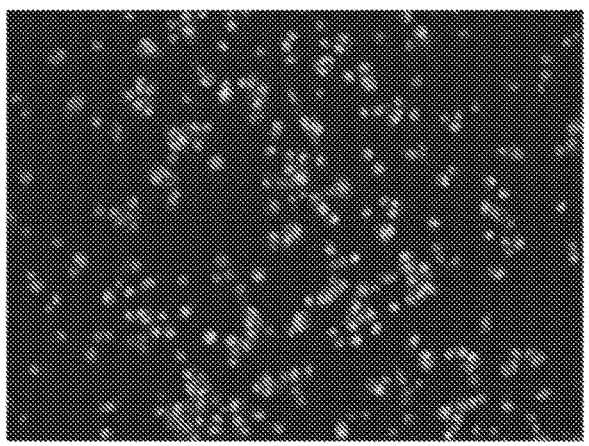
FIG. 9B is a fluorescent micrograph taken at a first location of a sample prepared by a comparative spin-drying method and then rehydrated.
Figure 9C:
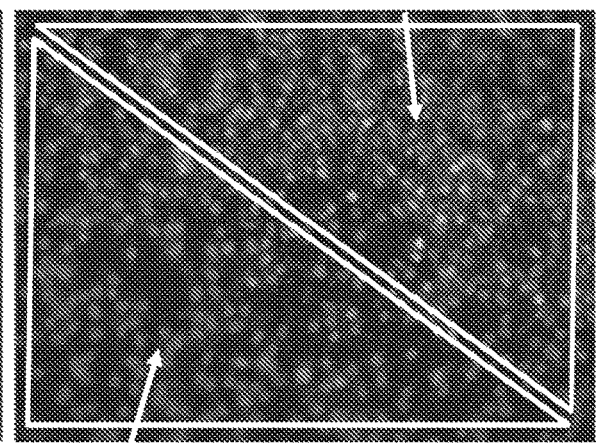
FIG. 9C is a fluorescent micrograph taken at a second location of the sample prepared by a comparative spin-drying method and then rehydrated.

After being lyo-processed, the samples are rehydrated and viability is once again assessed. FIG. 9A is a fluorescent micrograph that shows cells that were lyo-processed by the tension mediated method and then rehydrated. Almost all of the cells are green, which shows uniform spatial viability of the cells. The cells are greater than 95% viable following desiccation to extremely low moisture content of less than 0.12 gH$_2$O/g dry weight, which is estimated using a combination of Raman microspectroscopic and gravimetric methods. FIGS. 9B and 9C are fluorescent micrographs that show cells that were lyo-processed by the spin-drying method and then rehydrated. In FIG. 9B the cells are imaged near the center of the substrate and in FIG. 9C the cells are imaged near an edge of the substrate. Both FIGS. 9B and 9C show spatial non-uniformity in viability. The cells were desiccated using the same lyo-processing solution as cells prepared using the tension mediated method. The overall viability of the cells in FIGS. 9B and 7C is about 50%.

Figure 10A:
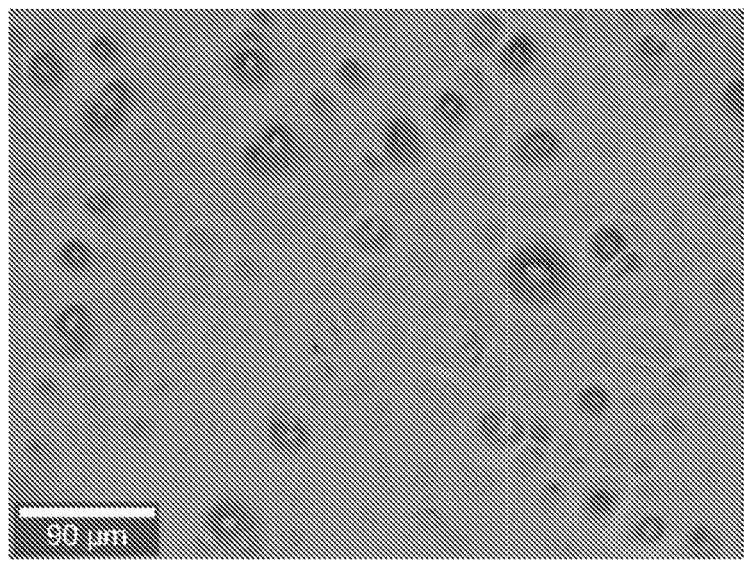
FIG. 10A is a micrograph that shows cells embedded in a vitrified matrix.
Figure 10B:
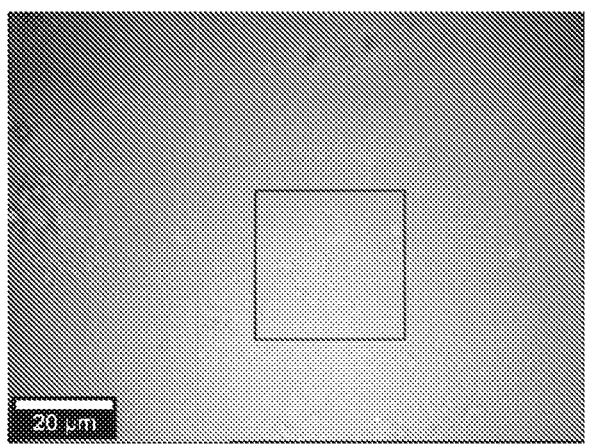
FIG. 10B is a second micrograph of cells embedded in a vitrified matrix; matrix, wherein a cell is identified for further imaging.
Figure 10C:
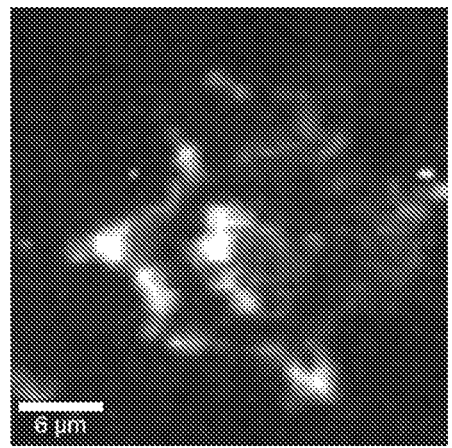
FIG. 10C shows hyperspectral Raman image of cytochrome-c from a cell identified in FIG. 10B.

Lyo-processed samples were imaged to provide a visual representation of cells preserved by the surface tension mediated lyo-processing. FIG. 10, for example, is an optical micrograph of cells embedded in a vitrified matrix. FIG. 10B is another micrograph of cells embedded in a glass matrix. FIG. 10C is hyperspectral Raman image of cytochrome-c (an inner mitochondrial membrane protein) in a cell identified in FIG. 10B. The image is reconstructed by Raman signal intensity at 750 cm$^{-1}$ after excitation with a 532 nm laser. FIG. 10C demonstrates that cells embedded within the vitrified matrix are viable.

Figure 11:
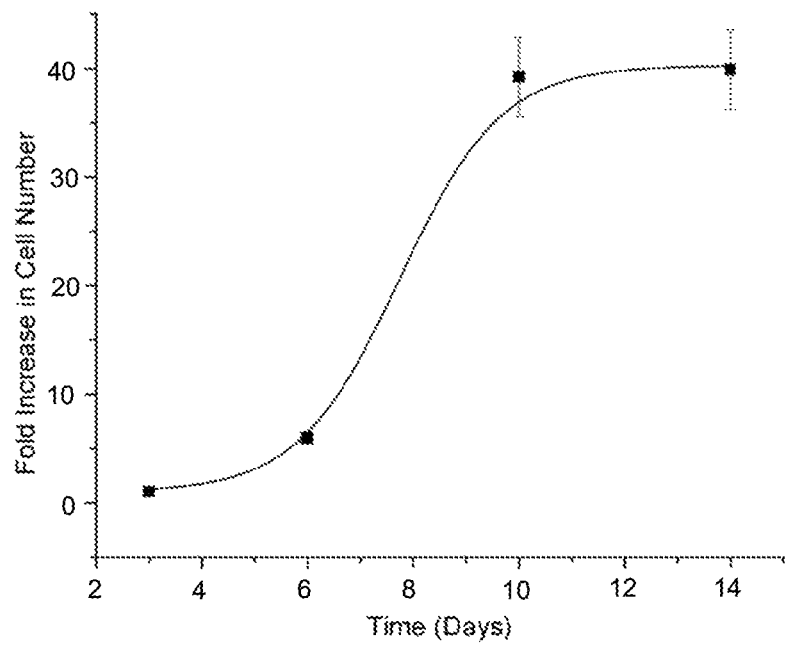
FIG. 11 is a growth curve prepared from HepG2 cells lyo-processed according to the current technology and then rehydrated.
Figure 12:
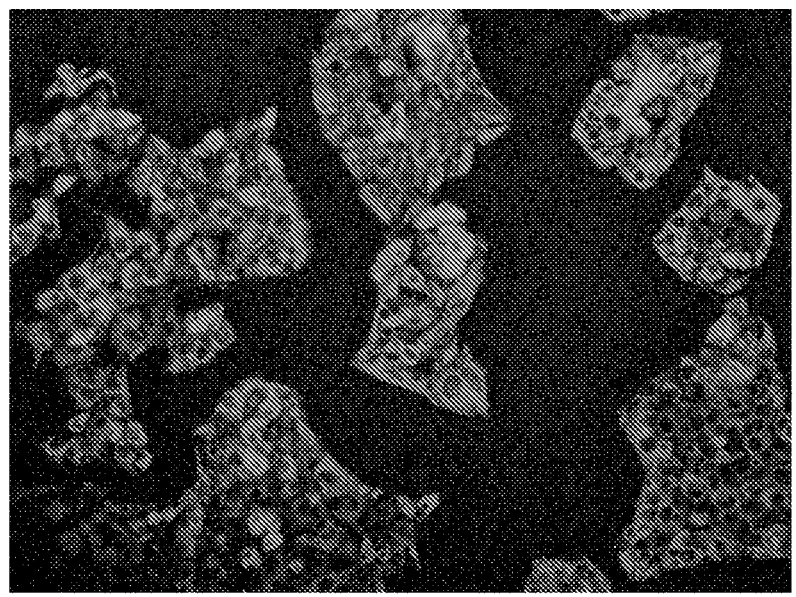
FIG. 12 is a fluorescence micrograph showing HepG2 cell nuclei stained blue and mitochondria stained red after the HepG2 cells were lyo-processed according to the current technology and then rehydrated.

A curve showing the growth of lyo-processed and rehydrated HepG2 cells was also prepared. Here, plates of HepG2 cells were prepared as described above and with a drawings speed of about 100 mm/min and an environment comprising N$_2$ (g). After lyo-processing, the cells had an average dryness of less than 0.12 gH$_2$O/gdw. Each plate of cells was then rehydrated with culture medium. Cells were counted (by a trypan blue exclusion technique) from plates on days 1, 6, 10, and 14. FIG. 11 is a growth curve showing that rehydrated cells went into a logarithmic growth phase between days 6 and 10 before they became confluent and contact inhibited. This growth curve further shows that the lyo-processed cells were viable and capable of growing to confluency. In one plate, on day 3, the nuclei of the cells were dyed blue with 4',6-diamidino-2-phenylindole (DAPI) and the mitochondria were stained red with MITO TRACKER® Red red-fluorescent dye (ThermoFisher Scientific). FIG. 12 is a fluorescence micrograph showing the stained cells. Substantially all of the cells were stained blue and red, which indicates that substantially all of the lyo-processed cells were viable.

Based on the foregoing results, the tension mediated method of the current technology generated far superior lyophilizing results relative to the spin-drying method.

The foregoing description of the embodiments has been provided for purposes of illustration and description. It is not intended to be exhaustive or to limit the disclosure.

Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for lyo-processing a biological material, the method comprising:
   generating a layer of the biological material on a substrate;
   submerging the substrate in a lyo-processing solution comprising a lyoprotectant;
   raising the substrate out of the lyo-processing solution; and
   contacting the biological material with an inert gas as the substrate is raised out of the lyo-processing solution to generate a lyo-stabilized biological material on the substrate.

2. The method according to claim 1, wherein the generating a layer of the biological material on a substrate comprises generating a cell monolayer on a substrate.

3. The method according to claim 2, wherein the generating a cell monolayer on a substrate comprises:
disposing a layer of an adhesion matrix on the substrate; and
culturing cells on the adhesion matrix.

4. The method according to claim 3, wherein the adhesion matrix comprises collagen, fibronectin, gelatin, laminin, entactin, or a combination thereof.

5. The method according to claim 2, wherein the cell monolayer comprises cells selected from the group consisting of human hepatocellular carcinoma cells (HepG2), human epithelial cells (HeLa), human airway epithelial cells (HBEC3-KT), Chinese hamster ovary cells (CHO), baby hamster kidney cells (BHK), human embryonic kidney cells (HEK 293), mouse brain tissue cells (Neuro-2a), mouse embryotic fibroblast cells (NIH-3T3), mouse macrophage cells (J774), rat pheochromocytoma cells (PC12), Drosophila melanogaster cells (Kc 167), primary human hepatocyltes, primary human keratinocytes, primary mouse hepatocytes, UACC-810 breast cancer cells, MCF-7 breast cancer cells, mesenchymal stem cells (MSCs), and combinations thereof.

6. The method according to claim 1, wherein the generating a layer of the biological material on a substrate comprises generating a monolayer of a biological molecule on the substrate, wherein the biological molecule is selected from the group consisting of a protein, a polypeptide, a peptide, an antibody, an antibody fraction, a nucleic acid, and combinations thereof.

7. The method according to claim 1, wherein the lyoprotectant of the lyo-processing solution is selected from the group consisting of be trehalose, maltose, sucrose, glucose, cellarabinose, ribose, fucose, talose, tagatose, fructose, galactose, isomaltose, nystose, maltotetraose, maltopentaose, maltohexaose, maltoheptaose, dextran, maltodextrose, xylobiose, mannitol, heptose, maltodextrin, hydroxyethyl starch, polyglycolic acid, inulin, fructo-oligosaccharides, galacto-oligosaccharides, mannan-oligosaccharides, lactose, cyclodextrins, hydroxyl propyl methyl cellulose, polysucrose and combinations thereof.

8. The method according to claim 7, wherein the lyo-processing solution is a buffer solution comprising:
a buffer with a pH of greater than or equal to about 6.5 to less than or equal to about 8.0;
greater than or equal to about 500 mM to less than or equal to about 1.9 M trehalose;
greater than or equal to about 5 mM to less than or equal to about 100 mM betaine; and
greater than or equal to about 5 mM choline to less than or equal to about 200 mM choline.

9. The method according to claim 8, wherein the buffer solution further comprises:
a salt selected from the group consisting of $K_2HPO_4$, $KH_2PO_4$, $Ca(H_2PO_4)_2$, $CaHPO_4$, $Ca_3(PO_4)_2$, $Ca_5(PO_4)_3(OH)$, and combinations thereof, wherein the salt has a total concentration of greater than or equal to about 100 μM to less than or equal to about 2 mM.

10. The method according to claim 8, wherein the buffer solution further comprises:
a sugar polyol selected from the group consisting of glycerol, erythriol, threitol, arbitol, xylitol, ribitol, mannitol, sorbitol, glactitol, fusitol, iditol, inositol, volemitol, isomalt, maltitol, lactitol, maltotiitol, maltotetraitol, polyglycitol, polyethylene glycol, and combinations thereof, wherein the sugar polyol has a concentration of greater than or equal to about 10 μM to less than or equal to about 500 mM.

11. The method according to claim 1, wherein the raising the substrate from the solution comprises raising the substrate out of the lyo-processing solution at a rate of greater than or equal to about 5 mm/min to less than or equal to about 500 mm/min.

12. The method according to claim 1, wherein the inert gas is selected from the group consisting of $N_2$, He, Ne, Ar, Kr, Xe, and combinations thereof.

13. The method according to claim 1, wherein the contacting the biological material with an inert gas as it is raised out of the solution comprises contacting the biological material with an insert gas at pressure of greater than or equal to about 5 psi to less than or equal to about 25 psi.

14. A method for lyo-processing a biological material, the method comprising:
submerging the biological material comprising biological molecules or cells disposed on a substrate in a lyo-processing solution comprising trehalose, betaine, and choline, the lyo-processing solution being substantially free of $Na^+$;
raising the biological molecules or cells disposed on the substrate out of the lyo-processing solution; and
passing the biological material disposed on the substrate through an environment that is substantially free of oxygen to lyo-stabilize the biological material.

15. The method according to claim 14, further comprising:
storing the lyo-stabilized biological material at ambient temperature.

16. The method according to claim 14, wherein the raising the biological material out of the lyo-processing solution comprises raising the biological material disposed on the substrate out of the lyo-processing solution at a rate of greater than or equal to about 5 mm/min to less than or equal to about 500 mm/min and contacting the biological material with an inert gas selected from the group consisting of $N_2$, He, Ne, Ar, Kr, Xe, and combinations thereof as the biological material is raised out of the lyo-processing solution.

17. The method according to claim 16, wherein the biological material comprises biological molecules selected from the group consisting of a protein, a polypeptide, a peptide, an antibody, an antibody fraction, a nucleic acid, and combinations thereof.

18. The method according to claim 16, wherein biological material comprises the of cells.

19. A method for lyo-processing a biological material, the method comprising:
generating a layer of the biological material on a substrate;
submerging the substrate in a lyo-processing solution comprising a lyoprotectant;
withdrawing the substrate from the lyo-processing solution at a rate of greater than or equal to about 5 mm/min to less than or equal to about 500 mm/min; and
contacting the biological material with an inert gas as the substrate is withdrawn from the lyo-processing solution to generate a lyo-stabilized biological material on the substrate.

* * * * *

UNITED STATES PATENT AND TRADEMARK OFFICE
CERTIFICATE OF CORRECTION

| | |
|---|---|
| PATENT NO. | : 11,297,828 B2 |
| APPLICATION NO. | : 16/085379 |
| DATED | : April 12, 2022 |
| INVENTOR(S) | : Nilay Chakraborty |

It is certified that error appears in the above-identified patent and that said Letters Patent is hereby corrected as shown below:

On the Title Page

Page 2, at Column 1, item (56) Line number 21, delete "hypersomotic" and insert -- hyperosmotic --.

In the Claims

At Column 17, Claim number 5, Line numbers 21-22, delete "hepatocyltes," and insert -- hepatocytes, --.

At Column 17, Claim number 7, Line number 35, after "of", delete "be".

At Column 18, Claim number 18, Line number 51, after "the", delete "of".

Signed and Sealed this
Thirteenth Day of September, 2022

Katherine Kelly Vidal
*Director of the United States Patent and Trademark Office*